United States Patent [19]
Suzuki et al.

[11] Patent Number: 6,068,739
[45] Date of Patent: May 30, 2000

[54] METHOD OF MANUFACTURING DATA RECORDING MEDIUM MADE OF ORDERED ALLOY THIN FILM

[75] Inventors: Toshio Suzuki; Naoki Honda; Kazuhiro Ouchi, all of Akita, Japan

[73] Assignee: Governor of Akita Prefecture, Akita-ken, Japan

[21] Appl. No.: 09/328,254

[22] Filed: Jun. 9, 1999

[30] Foreign Application Priority Data

Jun. 10, 1998 [JP] Japan .................................. 10-162318

[51] Int. Cl.⁷ .......................... G11B 11/10; G11B 11/12; C23C 14/34
[52] U.S. Cl. ..................................... 204/192.2; 204/192.1; 204/192.15; 204/192.26; 117/105; 117/106; 117/107; 117/108; 427/569; 427/576; 427/128; 427/131; 427/132
[58] Field of Search ........................... 204/192.1, 192.15, 204/192.2, 192.26; 117/105, 106, 108, 107; 427/569, 576, 128, 131, 132

[56] References Cited

U.S. PATENT DOCUMENTS 5,363,794 11/1994 Lairson et al. ............................. 117/7
5,603,766 2/1997 Visokay et al. .......................... 117/105

OTHER PUBLICATIONS

Saito et al, J. Magn. Soc. Jpn., 20:77–80 (nonth unknown), 1996.

Suzuki et al., J. Magn. Soc. Jpn., 21(S2):177–180 (month unknown), 1997.

Iwasaki, Shun–ichi and Nakamura, Yoshihisa; "An Analysis for the Magnetization Mode for the High Density Magnetic Recording"; *IEEE Transactions on Magnetics*; Mag–13(5):1272–1277; Sep. 1977.

Lu, Pu–Ling and Charap, Stanley H.; "Thermal instabiilty at 10 Gbit/in² magnetic recording"; *IEEE Transactions on Magnetics*; 30(6):4230–4232; Nov. 1994.

Iwasaki, S., et al.; "Gbit/in² Perpendicular Recording Using Double Layer Medium and MIG Head"; *IEEE Transactions on Magnetics*; 32(5):3795–3800; Sep. 1996.

Jiang, W.H. et al; "Bit Density Dependence of Thermal Relaxation in Perpendicular Magnetic Recording"; *Journal of J. Appl. Mag. Sec.*; 21(4–2):293–295; 1997 (month unknown).

Jiang, W.H., et al.; "Bit Density Dependence of Thermal Relaxation in Perpendicular Magnetic Recording"; *J. Magn. Soc. Jpn.*; 21:293–295; 1997 (month unknown).

Saito, K., et al.; Magnetic Microstructures of Co–Cr Films Sputter–Deposited at High Ar Pressures; *J. Magn. Soc. Jpn.*; 20:77–80; 1996 (month unknown).

(List continued on next page.)

*Primary Examiner*—Alan Diamond
*Attorney, Agent, or Firm*—Christensen O'Connor Johnson & Kindness PLLC

[57] ABSTRACT

A method of manufacturing a data recording medium for recording and reproducing data by use of a magnetic field or light and formed of an ordered alloy thin film comprising the steps of forming at least one underlayer principally containing an element or a compound selected from the group consisting of Cr, Pt, Pd, Au, Fe, Ni, MgO, NiO and controlled in such a way that a crystal plane having a crystal lattice face of a Miller index (100) is in parallel to a substrate, and forming an ordered alloy layer with $L1_0$ crystal structure by sputter deposition within the range satisfying Equation 1: P×D>3000, where P is Ar sputter-gas pressure (Pa) and D is a target-substrate distance (mm), is disclosed. When a recording medium is formed of an ordered alloy thin film by using a glass substrate for a hard disk for industrial use, according to the method of the present invention, formation of an ordered phase required for exhibiting large magnetocrystalline anisotropy is accelerated at a low temperature allowing usage of the glass substrate, so that the recording medium is improved in thermal stability.

3 Claims, 4 Drawing Sheets

OTHER PUBLICATIONS

Coffey, Kevin R., et al.; "High Anisotropy $L1_0$ Thin Films for Longitudinal Recording"; *IEEE Transactions on Magnetics*; 31(6):2737–2739; Nov. 1995.

Suzuki, Toshio, et al.; "Preparation and Magnetic Properties of Sputter–Deposited Fe–Pt Thin Films with Perpendicular Anisotropy"; *J. Mag. Soc. Jpn.*; 21(S2):177–180; 1997 (month unknown).

Watanable, Masato and Homma, Motofumi; "Perpendicular Magnetization of Epitaxial FePT(001) Thin Films with High Squareness and High Coercive Force"; *Jp. J. Appl. Phys.*; 35(2):1264–1267; Oct. 1, 1996.

Shimvun, Nikkan Kogyo; "Fandamentals of Thin Film Formation"; 108–111 (Date Unknown).

Lee, Li'Lien, et al.; "MgO seed layers for CoCrPt/Cr longitudinal magnetic recording media"; *Appl. Phys. Lett.*; 67(24):3638–3640; Dec. 11, 1995.

Kataoka, Kiroyuki, et al.; "Magnetic and Recording Characteristics of Cr, Ta, W and Zr Pre–Coated Glass Disks"; *IEEE Transactions on Magnetics*; 31(6):2734–2736; Nov. 1995.

Saito, K. et al.; "Magnetic Microstructures of Co–Cr Films Sputter–Deposited at High Ar Pressures"; *Journal of J. Appl. Mag. Sec.*; 20(2):77–80; 1996 (month unknown).

METHOD OF MANUFACTURING DATA RECORDING MEDIUM MADE OF ORDERED ALLOY THIN FILM

BACKGROUND OF THE INVENTION

The present invention relates to a high-density data recording technique, and more particularly, to a method of manufacturing a recording medium excellent in thermal stability of magnetic recording data.

Recently, magnetic recording media have been aggressively studied and developed as a possible means for recording a large amount of data. Among them, in magnetic recording media for use in computer hard disk drives, tendency toward a high areal recording density has been tremendously accelerated.

Now used as the recording medium is the recording system called "longitudinal magnetic recording". The longitudinal magnetic recording is a recording method for recording signals in an in-plane direction of the recording film by directing a magnetization vector to the in-plane direction. However, to attain further higher-density recording, attention has been attracted to "perpendicular magnetic recording", which is a recording method for recording signals in a perpendicular direction of the recording film by directing the magnetization vector to the perpendicular direction (see S. Iwasaki and Y. Nakamura; IEEE Trans. Magn., vol. MAG-13, pp 1272–1277, 1977).

In either recording system, a Co—Cr system alloy is principally used as a magnetic recording material for a recording layer. In this case, the crystal orientation of the Co—Cr system alloy is controlled by a material, a crystal orientation, or a lattice constant of its underlayer placed immediately thereunder. It is therefore possible to control a direction of an easy axis of magnetization responsible for defining a direction of the magnetization vector. Today, using such a technique, a longitudinal magnetic recording medium or a perpendicular magnetic recording medium using the Co—Cr system alloy is manufactured.

However, when the Co—Cr system alloy is employed in the longitudinal magnetic recording, a phenomenon called "thermal relaxation" occurs (reported by P. L. Lu and S. H. Charap (IEEE Trans. Magn., vol. 30, 4230 (1994))). The "thermal relaxation" is a phenomenon where recorded data is deteriorated during long term storage, as the recording density increases.

In contrast, the perpendicular magnetic recording is superior to the longitudinal magnetic recording in consideration of not only a possibility of the high-density recording but also thermal relaxation (reported by S. Iwasaki, K. Ouchi and N. Honda, IEEE, vol. 32, 3795 (1996)).

However, as shown in a computer simulation reported by Jiang, Muraoka, Takawa, and Nakamura (Jpn. J. Appl. Phys. Vol. 21, 293, (1997)), the thermal relaxation also occurs in the perpendicular magnetic recording medium.

The thermal relaxation remarkably occurs as a ratio of magnetic energy ($K_u \times v$) of a magnetic grain contained in a magnetic material to thermal energy ($k_B \times T$) from the circumstance surrounding the magnetic material decreases.

$$(K_u \times v)/(k_B \times T) \quad \text{(Equation 2)}$$

Where, $K_u$ is a magnetocrystalline anisotropy constant, $v$ is magnetic grain size, $k_B$ is the Boltzmann constant, and $T$ is an absolute temperature of the circumstance.

In other words, the thermal relaxation manifests more clearly as the recording density increases. This is because the size of magnetic grains decreases with the increase in recording density. Therefore, to increase the energy ratio, the magnetocrystalline anisotropy constant intrinsic to the recording material must be increased.

K. R. Coffey, M. A. Parker and J. K. Howard et al. (IEEE Trans. Mag., vol. 31, 2737 (1995)) form a thin film with random crystalline orientation using an ordered alloy with $L1_0$ crystal structure to realize the longitudinal magnetic recording. According to this technique, after completion of film formation, the thin film is annealed to form an ordered phase having high magnetocrystalline anisotropy. In this case, however, the obtained perpendicular magnetization component is small. It is therefore difficult to apply this technique to the perpendicular magnetic recording medium in expectation of the high density recording.

Furthermore, T. Suzuki, N. Honda and K. Ouchi (J. Magn. Soc. Jpn., 21-S2, 177 (1997) have suggested a sputter deposition method and a layer structure in order to attain the perpendicular crystalline orientation of the ordered alloy with $L1_0$ crystal structure. However, a sufficient perpendicular anisotropy cannot be imparted by this technique. Furthermore, since the film used in the magnetic recording medium in practice is as thin as about 50 nm or less, it does not exhibit a hard magnetic property. Therefore, such a film cannot be used as a magnetic recording medium as long as it is maintained in this state.

On the other hand, as a method of attaining perpendicular anisotropy of the ordered alloy thin film with $L1_0$ crystal structure, a sputter deposition method using an MgO single crystalline substrate is disclosed by M. Watanabe and M. Homma (Jpn. J. Appl. Phys. Vol. 35, L1264 (1996)). However, since the MgO single crystalline substrate is expensive, it is difficult to industrially use it as the substrate for use in a hard disk. Furthermore, since processing is performed at as high a temperature as 600° C., a glass or an Al substrate for a hard disk cannot be used. Moreover, the magnetic property obtained by this method is a so-called "wall motion mechanism in its magnetization reversal process". Even if signals are recorded on this thin film, a medium noise would be too large to obtain a sufficient signal to noise ratio. Therefore, it is easily predicted that the film obtained by this method is not suitable as the magnetic recording medium.

From the foregoing, it has been strongly desired to develop a method of forming a perpendicular magnetic anisotropic thin film having a high magnetocrystalline anisotropy and a small magnetic domain structure (which means that medium noise is low) by using the industrially applicable hard disk substrate.

BRIEF SUMMARY OF THE INVENTION

The present invention was made in view of the aforementioned circumstances. An object of the present invention is to provide a method of manufacturing a recording medium enabling high density data recording, in particular, exhibiting excellent thermal stability in the recording data.

To solve the aforementioned problems and to attain the aforementioned object, the following means are devised.

The present invention provides a novel method of manufacturing a thin film having a high perpendicular magnetrocrystalline anisotropy and attaining a small magnetic domain structure as described in the claims.

According to the present invention, there is provided a method of manufacturing a data recording medium formed of an ordered alloy thin film comprising the steps of:

forming at least one underlayer which is principally made of an element or an compound selected from the group consisting of Cr, Pt, Pd, Au, Fe, Ni, MgO and NiO and controlled in such a way that a crystal plane having a crystal lattice face of a Miller index (100) is in parallel to a substrate; and forming an ordered alloy layer with $L1_0$ crystal structure by sputter-deposition within the range satisfying the following Equation:

$$P \times D > 3000$$

where P is Ar sputter-gas pressure (Pa) and D is a target-substrate distance (mm).

It is preferable that the underlayer of the method described above be formed of a Cr alloy.

It is also preferable that the ordered alloy layer with $L1_0$ crystal structure be formed of FePt, CoPt, FePd or an alloy of these elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
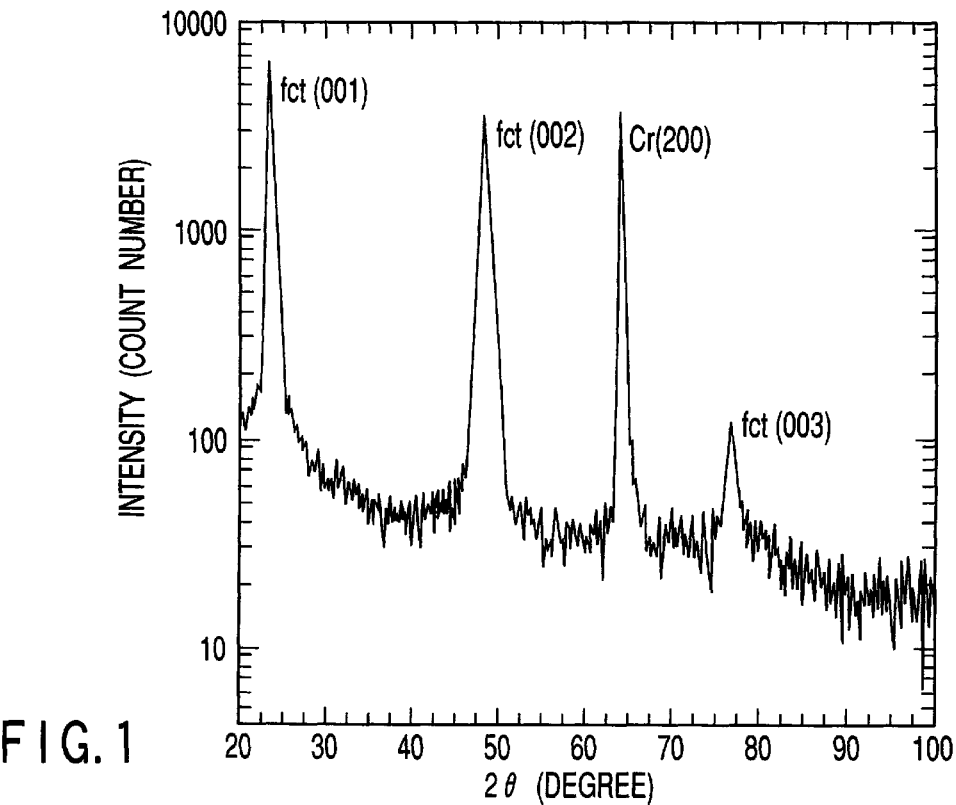
FIG. 1 is a graph showing an X-ray diffraction pattern according to Embodiment 1 of the manufacturing method of the present invention.

A manufacturing method according to the present invention will be specifically explained with reference to an embodiment.

The present invention is directed to a method of manufacturing a data recording medium for recording and reproducing data by use of a magnetic field or light. Specifically, the present invention is directed to a method of manufacturing a data recording medium, comprising the steps of forming at least one underlayer which is principally made of an element or a compound selected from the group consisting of Cr, Pt, Pd, Au, Fe, Ni, MgO and NiO and controlled in such a way that a crystal plane having a crystal lattice face of a Miller index (100) is in parallel to a substrate, and then forming an ordered alloy layer with $L1_0$ crystal structure by sputter-deposition under the range satisfying Equation 1 below.

$$P \times D > 3000 \qquad \text{(Equation 1)}$$

Where P is an Ar sputter-gas pressure (Pa), D is a target-substrate distance (mm).

The layered structure of the thin film for recording medium is formed in accordance with the sputter-deposition under the conditions in which the product of the target-substrate distance and the gas pressure for use in manufacturing is larger than a predetermined number (i.e. 3000).

As described, in the method of the present invention, the underlayer is formed of principally an element or a compound selected from the group consisting of Cr, Pt, Pd, Au, Fe, Ni, MgO and NiO, by, for example, the sputter-deposition method.

A symmetric property of a (100) crystal plane of the underlayer is the same as that of the crystal plane (001) of an ordered alloy layer with $L1_0$ crystal structure. Furthermore, an absolute value of a misfit, which indicates the difference in distance between adjacent crystal planes for both cases (see, for example, page 110 of "Fundamentals of thin-film formation" written by Asamaki Tatuo, third edition, Nikkan Kogyo Shinbunn Sha (in Japanese)) is as small as 10% or less. Therefore, the crystal plane of the underlayer has a particularly excellent effect on orientation control of the ordered alloy layer with $L1_0$ crystal structure.

Furthermore, to improve orientation of the underlayer crystal plane (100) or to control the recording property, a plurality of layers may be formed.

As the ordered alloy with $L1_0$ crystal structure, for example, FePt, CoPt, FePd or an alloy of these elements may be employed.

Also in this case, the conditions of Equation 1 must be maintained. This is because if the ordered alloy layer with $L1_0$ crystal structure is formed by the sputter-deposition method at a "P×D" value of 3000 or less, formation of the ordered phase is not accelerated, with the result that sufficient magnetic anisotropy cannot be obtained. Conversely, if the film is formed at a P×D value of 10000 or more, abnormal discharge tends to occur during the film formation process, and furthermore, the film formation speed is significantly reduced. These phenomena are not preferable in view of practical applications. In addition, when the film is formed under the condition satisfying a P×D value of 10000 or more, an extremely large apparatus is required. Hence, it is difficult in practice to form the film at a P×D value of 10000 or more. The P×D value shown by Equation 1 must fall within the range from 3000 or more to 10000 or less.

The optimum temperature range of a substrate for forming the ordered alloy layer with $L1_0$ crystal structure, varies depending upon an alloy element or the composition. In the case of an FePt composition, the temperature of a substrate preferably falls within the range of about 400° C. to 500° C.

The film thickness of the ordered alloy layer of this type can be determined in view of recording and reproduction property and is not particularly limited. However, it is preferred that the film thickness fall within the range of about 5 nm to 200 nm.

To control orientation of a crystal plane (100) of the Cr alloy layer set forth in claim 2, MgO or Ta is previously deposited. The method how to deposit MgO or Ta is disclosed in the following two documents 1 and 2 and therefore, detailed explanation thereof will be omitted.

Document 1: Li-Lien Lee, B. K. Cheong, D. E. Laughhlin and D. N. Lamberth (Appl. Phys. Lett. 67 (1995) 3638); and Document 2: H. Kataoka, T. Kanabe, and H. Kashiwase (IEEE. Trans. Magn., 31 (1995) 2734).

Incidentally, as the orientation of the Cr (100) plane is improved at a half value width at the x-ray rocking curve, the crystalline orientation of the upper layer thereof is also improved, bringing an improvement in magnetic anisotropy.

To the Cr alloy layer of the present invention, a transition metal such as Ti, Zr, or Mo, a semimetal such as Si or Ge, or an amphoteric metal such as Al may be added as long as a Cr crystalline structure can maintain a body-centered cubic lattice, as in the same case as in the underlayer of a conventionally used Co—Cr system alloy thin film medium. For example, when Ti is added, an amount of about 10 atomic % may be acceptable. If such an element is added, it is possible to control a lattice constant, crystallinity, orientation and diameters of crystal grains.

According to a method of an embodiment of the present invention, an excellent perpendicular magnetic anisotropy can be obtained even if any kind of substrate is used. For example, even though a glass substrate for use in a hard disk is used in practice, a more excellent perpendicular magnetic anisotropy can be obtained than in the case using a conventional technique. Furthermore, a small magnetic domain structure suitable for the magnetic recording can be obtained. Detailed data for the perpendicular magnetic anisotropy and magnetic domain structure will be exemplified in Embodiments 1–7 described later. Hence, the present invention is applicable as a method of manufacturing a magnetic recording medium of the perpendicular magnetic recording.

(Modification 1)

In another layer structure formation method other than the exemplified method, the ordered alloy may be directly deposited on the Cr alloy layer. To control a lattice constant, Pd, Pt, or Au may be used between them. Furthermore, Fe, an FeSi alloy, or a permalloy may be used to control the recording property.

To evaluate what kind of magnetic property the layered structure formed by the manufacturing method of the present invention has, and to evaluate whether the layer structure is excellent as a recording medium or not, the three evaluation methods below are employed.

(1) The crystalline orientation and crystalline structure are evaluated by X-ray diffraction using a Cu-Kα ray. An amount of the ordered phase formed is evaluated by using, as an index, a value obtained by dividing integrated intensity for fct (face-centered tetragonal)(001) line by film thickness as indicated by T. Suzuki, N. Honda and K. Ouchi (J. Magn. Soc. Jpn. 21-S2, 177 (1977).

(2) The magnetic property is evaluated by an alternating gradient force magnetometer in the manner shown in T. Suzuki, N. Honda and K. Ouchi (J. Magn. Soc. Jpn. 21-S2, 177 (1977)). Incidentally, as a reference for the perpendicular magnetic anisotropy, the following Equation 3 and Equation 4 are used.

$$Mr\perp/Mr\| > 1 \qquad \text{(Equation 3)}$$

where "$Mr\perp$" and "$Mr\|$" respectively show residual magnetization (emu/cm$^3$) in a perpendicular direction and residual magnetization in an in-plane direction to the film surface.

Equation 3 shows that the ratio of the residual magnetization in the perpendicular direction to the residual magnetization in the in-plane direction is larger than 1.

$$Hc\perp/Hc\| > 1 \qquad \text{(Equation 4)}$$

where "$Hc\perp$" and "$Hc\|$" respectively show coercivity (Oe) in a perpendicular direction and coercivity in an in-plane direction to the film surface.

Equation 4 shows that the ratio of the coercivity (Oe) in the perpendicular direction to the coercivity in the in-plane direction is larger than 1.

Equations 3 and 4 show that the anisotropy in the perpendicular direction is larger than the anisotropy in the in-plane direction.

(3) The size of the magnetic domain is evaluated by subjecting a sample to AC demagnetization and thereafter analyzing it by using a spectrum of a magnetic image observed using magnetic force microscopy. (see a document written by Kyoko Saito, Naoki Honda, Kazuhiro Ouchi (Jpn. J. Appl. Phys. Vol. 20, 77 (1996))).

Now, advantages brought by the present invention will be explained with reference to Embodiments 1–7 of the present invention in comparison with Comparative Examples 1–5 employing a conventional technique. Note that the comparison is made in accordance with the aforementioned evaluation methods.

(Embodiment 1)

According to an embodiment employing the manufacturing method of the present invention, a thin film was formed as follows:

First, MgO was deposited on a glass substrate for use in a hard disk in a film thickness of 10 nm by a "rf magnetron sputter-deposition method". Then, Cr was deposited in a film thickness of 70 nm by a "DC magnetron sputter-deposition method". Furthermore, FePt was deposited in a film thickness of 43 nm by a "rf sputter deposition method" using an FePt alloy target at a substrate temperature of 450° C. MgO and Cr were deposited at a gas pressure of 0.2 Pa. FePt was formed at a gas pressure (P) of 100 Pa while maintaining a target-substrate distance of 50 mm. In other words, the thin film was manufactured under the conditions satisfying P×D= 5000.

(Advantage 1)

FIG. 1. shows an X-ray diffraction pattern of a thin film formed by the aforementioned method. From the figure, it is found that the diffraction pattern of the ordered FePt alloy exhibiting a Miller index (001) of a crystal plane is obtained which is required for the perpendicular magnetic anisotropy as an orientation. In other words, the figure shows that the face-centered tetragonal fct (001) diffraction line exhibits a large intensity.

The half value widths at the x-ray rocking curve of Cr (200) is 2.8 and the half value of FePt (001) is 4.3 degrees, respectively.

According to the data of Table 1, the ratio of residual magnetization in the perpendicular direction to that in the in-plane direction, that is, $Mr\perp/Mr\|=24.48$, and the ratio of coercivity in the perpendicular direction and that in the in-plane direction, that is, Hc⊥/Hc∥=5.83. More specifically, in Embodiment 1, as indexes of the perpendicular magnetization property of the thin film manufactured under the condition of P×D=5000, residual magnetization ratio is 24.28 and the coercivity ratio is 5.83. These values are considerably large, suggesting that the values in the perpendicular direction are considerably large.

Figure 2:
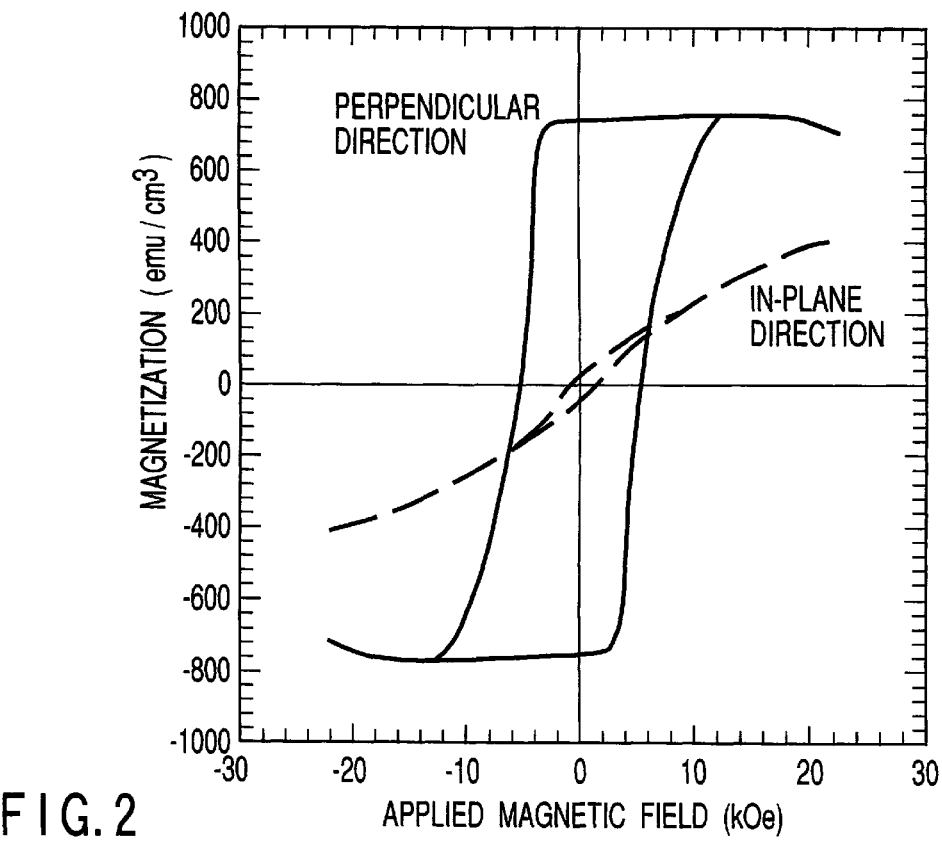
FIG. 2 is a graph showing a magnetic property according to Embodiment 1 of the manufacturing method of the present invention.
Figure 8:
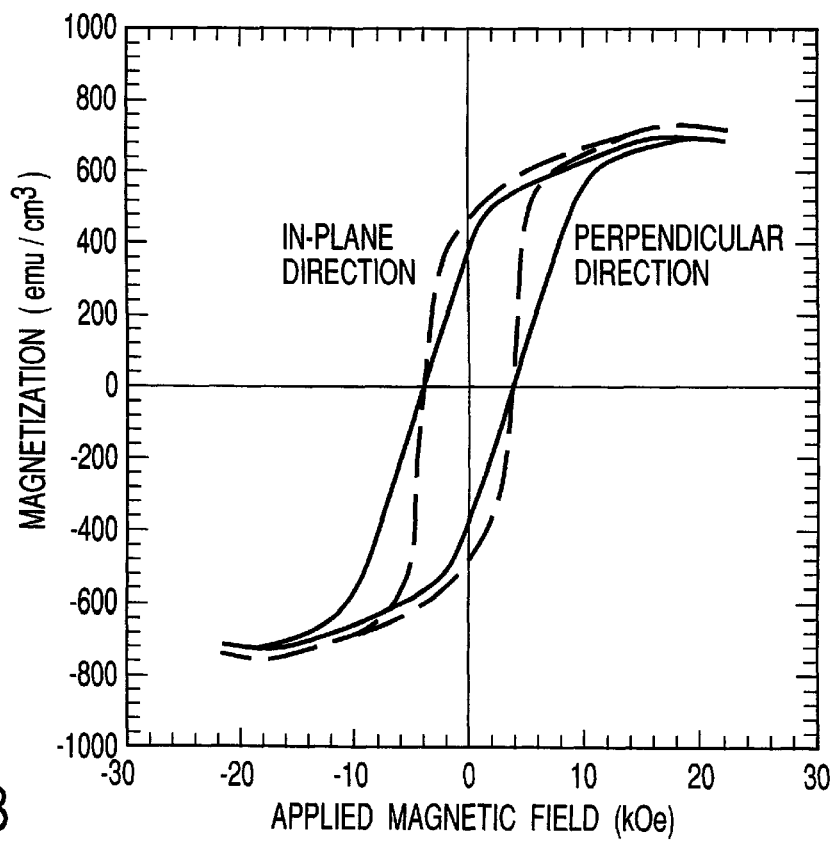
FIG. 8 is a graph showing a magnetic property according to Comparative Embodiment 2 using a conventionally-employed manufacturing method.

The graph of FIG. 2 shows the magnetic property of the thin film formed by the manufacturing method of the present invention, indicating that indexes Mr⊥/Mr∥ and Hc⊥/Hc∥ are larger than those of the magnetic property of the thin film formed by a conventional technique in Comparative Example exemplified in FIG. 8. More specifically, the figure demonstrates that the thin film formed in this embodiment has an excellent perpendicular magnetic anisotropy.

(Comparative Example 1)

A magnetic thin film to be used as a comparative example to the manufacturing method of the present invention was manufactured by using a conventional method. FePt was deposited in a film thickness of 52 nm directly on a glass substrate (for use in forming a hard disk) by the rf sputter-deposition method using an FePt alloy target. FePt was deposited at a gas pressure (P) of 100 Pa while keeping a target-substrate distance (D) of 50 mm. This is an example satisfying Equation 1, P×D=5000.

That is:

Embodiment 2: P×D=3500, residual magnetization ratio=4.77 coercivity ratio=3.06

Embodiment 3: P×D=4000, residual magnetization ratio=2.30 coercivity ratio=1.28

Embodiment 3: P×D=4000, residual magnetization ratio=2.30 coercivity ratio=1.28

Embodiment 4: P×D=4550, residual magnetization ratio=12.3 coercivity ratio=6.34

Embodiment 5: P×D=4750, residual magnetization ratio=3.70 coercivity ratio=1.61

Embodiment 6: P×D=5600, residual magnetization ratio=5.76 coercivity ratio=4.87

Data specific to Embodiments 1–6 according to the manufacturing methods of the present invention are collectively shown in Table 1.

TABLE 1

| | P (Pa) | D (mm) | P × D (Pa · mm) | d: Film thickness (nm) | I: fct (001) Integrated intensity for fct (001) line (CPS) | I/d (CPS/nm) | Mr ⊥/Mr ∥ | Hc ⊥/Hc ∥ |
|---|---|---|---|---|---|---|---|---|
| Embodiment 1 | 100 | 50 | 5000 | 43 | 3652 | 84.9 | 24.48 | 5.83 |
| Embodiment 2 | 70 | 50 | 3500 | 20.4 | 1029 | 50.4 | 4.77 | 3.06 |
| Embodiment 3 | 50 | 80 | 4000 | 38.3 | 2137 | 55.7 | 2.3 | 1.28 |
| Embodiment 4 | 70 | 65 | 4550 | 20.7 | 1305 | 63.0 | 12.3 | 6.34 |
| Embodiment 5 | 50 | 95 | 4750 | 35 | 2056 | 58.7 | 3.7 | 1.61 |
| Embodiment 6 | 70 | 80 | 5600 | 13.8 | 1059 | 76.7 | 5.76 | 4.87 |

Figure 7:
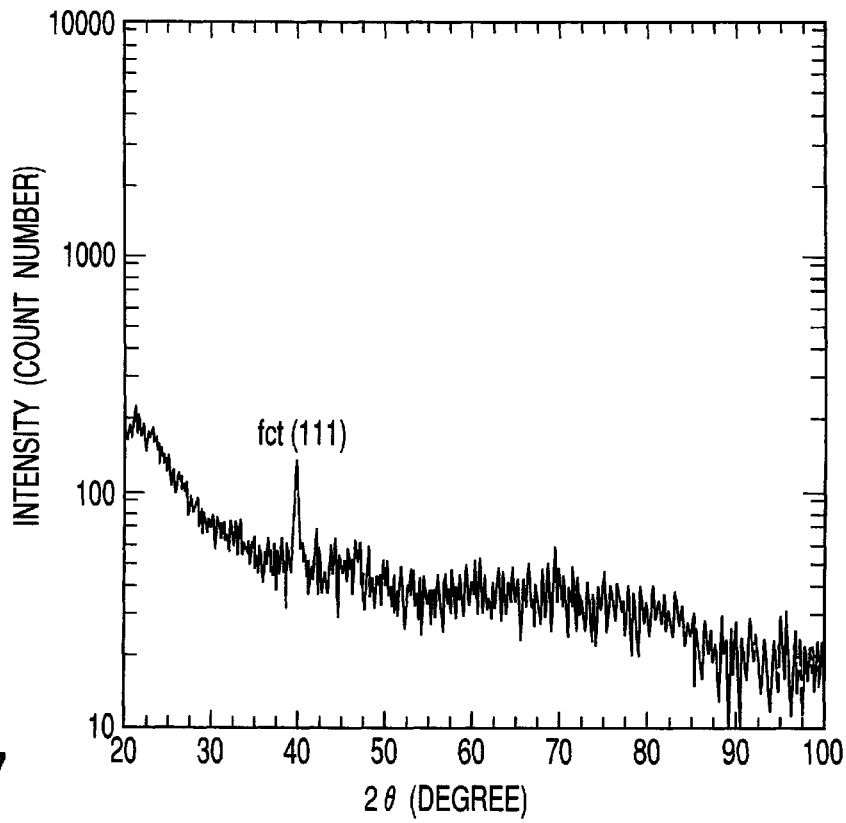
FIG. 7 is an X-ray diffraction pattern according to Comparative Embodiment 1 using a conventionally-employed manufacturing method.

An X-ray diffraction pattern of the thin film formed by the conventional technique is shown in FIG. 7. As shown in the diffraction pattern, the thin film has a (111) orientation, which is not an advantageous orientation to the perpendicular magnetic anisotropy.

(Comparative Example 2)

Another magnetic thin film is formed as another comparative example according to a conventional technique. A thin film medium was prepared in the same satisfying Equation 1.

According to the magnetic property of the resultant film shown in FIG. 8, a ratio of the residual magnetization in the perpendicular direction and that in the in-plane direction is 0.8 (Mr⊥/Mr∥=0.8), and a ratio of the coercivity in the perpendicular direction and that in the in-plane direction is 0.91 (Hc⊥/Hc∥=0.91). Since the value of the perpendicular direction is small, it is demonstrated that the thin film manufactured by the conventional technique does not exhibit sufficient perpendicular magnetization anisotropy.

(Embodiments 2–6)

According to embodiments of the manufacturing method of the present invention, thin films were formed as follows: FePt thin film mediums were formed in the same layered structure as in Embodiment 1 under various conditions satisfying Equation 1 as shown in Table 1. Note that any condition listed in Table 1 satisfies Equation 1.

The manufacturing conditions differ but manufacturing methods of the embodiments are substantially the same as in Embodiment 1, so that the explanation thereof will be omitted. The results of the Embodiments 2–6 will be compared to those of the Comparative Examples 1–2.

(Advantages of Embodiments 2–6)

Figure 3:
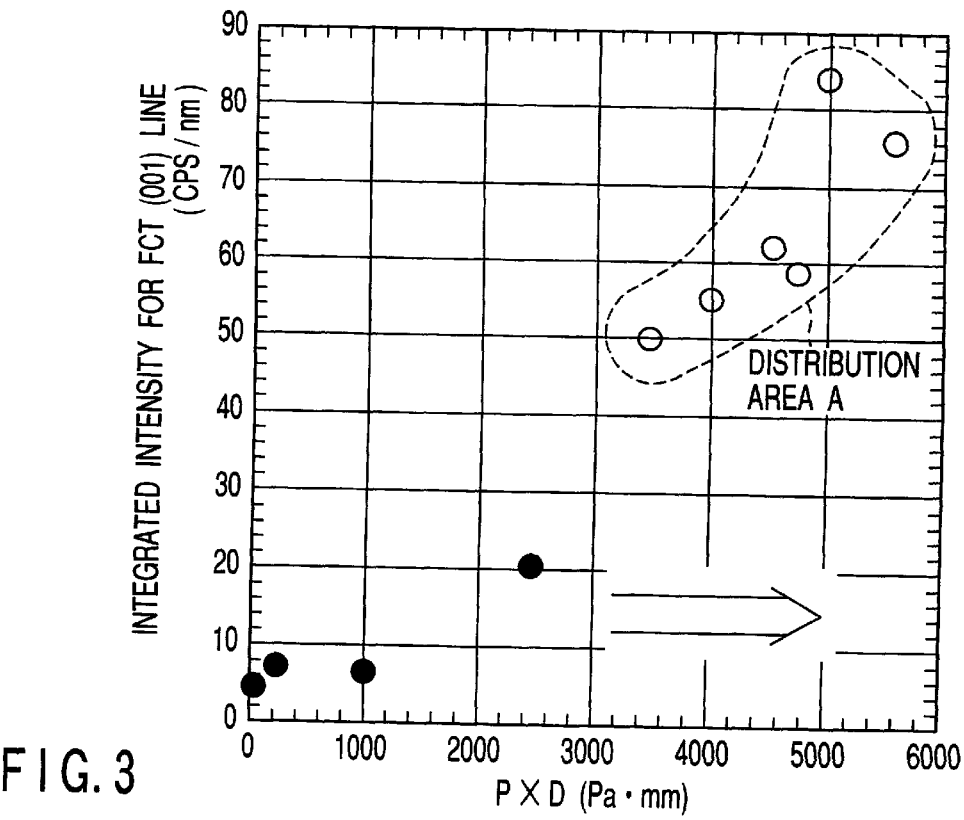
FIG. 3 shows the distribution of ratios of the integrated intensity for fct (001) line to film thickness, serving as an index for formation of an ordered phase, when the thin film is formed according to the manufacturing methods of the present invention with various P×D.

The integrated intensity for fct (001) line of each of thin films formed under aforementioned conditions is analyzed on the basis of the X-ray diffraction and shown in Table 1 and FIG. 3.

FIG. 3 shows the results of the integrated intensity for fct (001) line in these Embodiments 2–6. The results fall within distribution area A (indicated by a broken line). Note that distribution area A shows a distribution area of the integrated intensity for fct (001) lines obtained in the aforementioned Embodiments 2–6.

From the results, it is found that as the "P×D" value increases, the formation of an ordered phase is accelerated.

Figure 4:
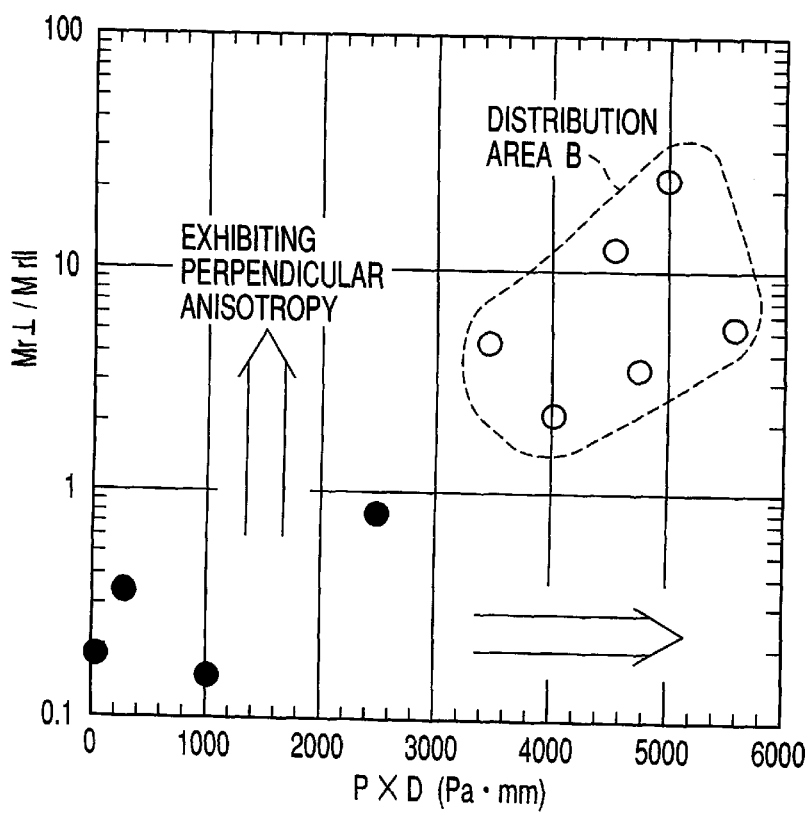
FIG. 4 shows the distribution of ratios of the residual magnetization in a perpendicular direction to the residual magnetization in an in-plane direction, serving as an index for perpendicular magnetization anisotropy, when the thin film is formed according to the manufacturing method of the present invention with various P×D.
Figure 5:
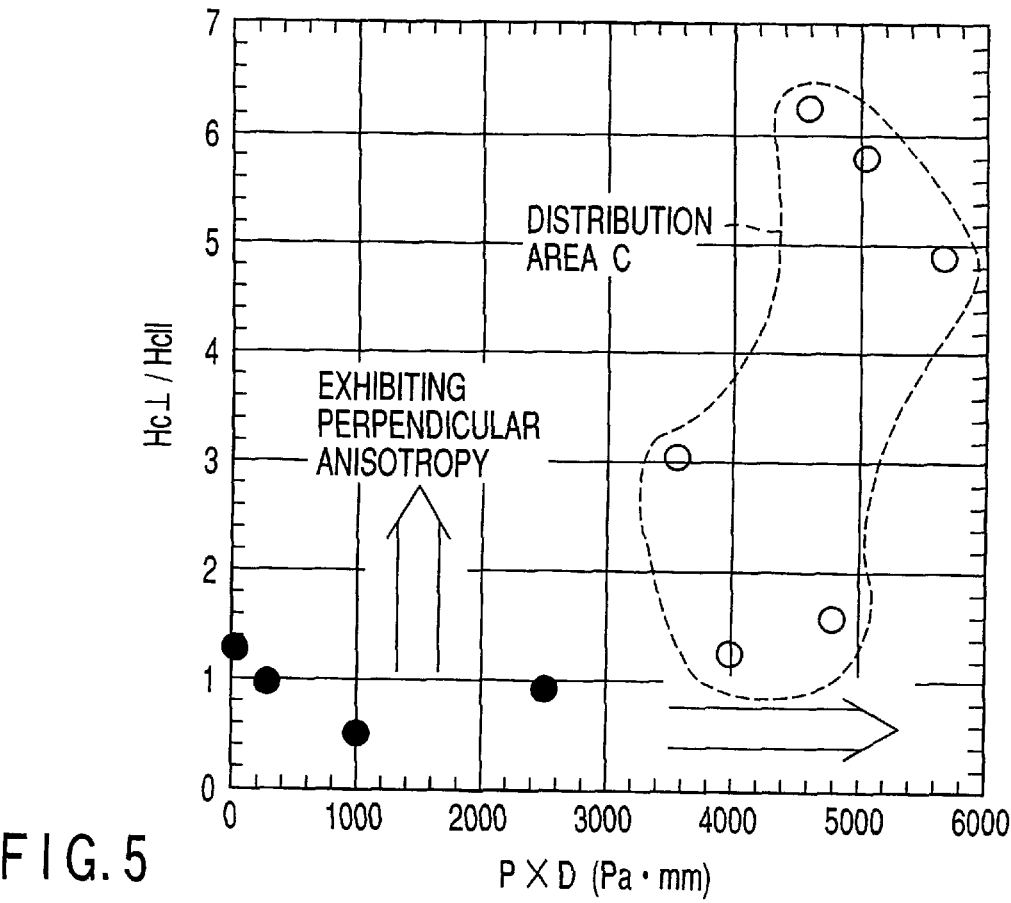
FIG. 5 shows the distribution of ratios of the coercivity in a perpendicular direction to the coercivity in an in-plane direction, serving as an index for perpendicular magnetization anisotropy, when the thin film is formed according to the manufacturing method of the present invention with various P×D.

A ratio of the residual magnetization in the perpendicular direction to that in the in-plane direction (Mr⊥/Mr∥), and a ratio of the coercivity in the perpendicular direction and that in the in-plane direction (Hc⊥/Hc∥), serving as indexes of the perpendicular anisotropy, are respectively shown in Table 1 and FIGS. 4 and 5.

The results of the Embodiments 2–6 are plotted by open circles. The open circles fall in distribution areas B and C indicated by broken lines (respectively in FIGS. 4 and 5) within the scope of the present invention, that is, P×D>3000. Note that distribution area B shows distribution of ratios of the residual magnetization in the perpendicular direction to that in the in-plane direction, obtained in the aforementioned Embodiments. Distribution area C shows distribution of ratios of the coercivity in the perpendicular direction and that in the in-plane direction, obtained in the aforementioned Embodiments.

From these experimental results, it is demonstrated that the thin films thus manufactured show excellent perpendicular magnetic anisotropy.

(Comparative Examples 3–5)

Thin films according to Comparative Embodiments 3–5 were manufactured by a conventional technique as follows: FePt was deposited in the same layered structure as in Embodiment 1 under various conventionally-used conditions shown in Table 2. Based on the X-ray diffraction analysis for the obtained thin films, the integrated intensities for fct (001) line are listed in Table 2 and plotted by solid circles in FIG. 3.

Table 2 shows data of the thin films (Comparative Examples 2–5) manufactured according to conventional technique.

(Advantage 7)

Figure 6:
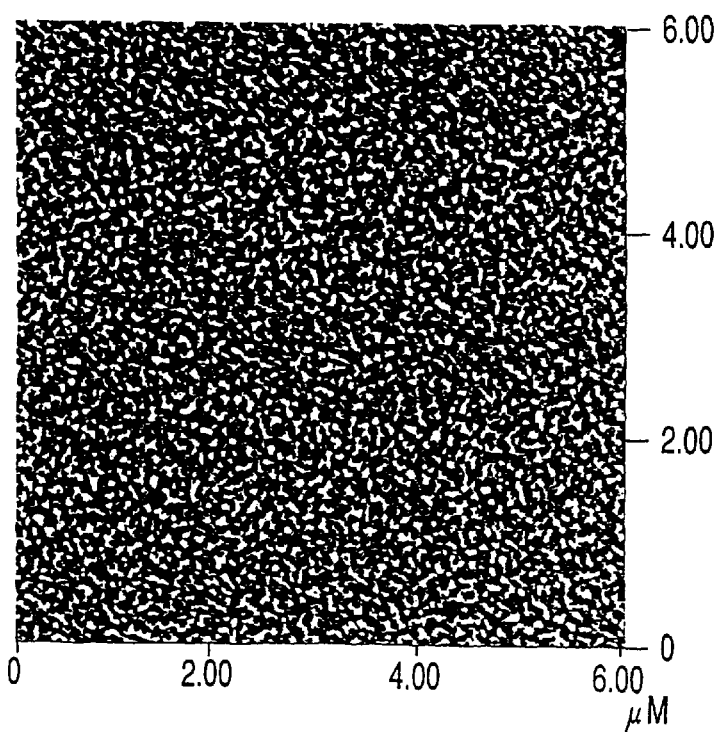
FIG. 6 is a magnified view of a magnetic image according to Embodiment 7 of the present invention observed by magnetic force microscopy.

FIG. 6 shows a magnetic domain structure observed by magnetic force microscopy for the thin film of Embodiment 7. According to the spectroscopy of a magnetic image, it is found that the size of magnetic domain thus formed is 67 nm, which is extremely small.

The resultant film is excellent in magnetic property in the perpendicular direction. This is because a ratio of the residual magnetization in the perpendicular direction to that in the in-plane direction is 3.91 (Mr⊥/Mr∥=3.91), and a ratio of the coercivity of the perpendicular direction to that in the in-plane direction is 5.81, (Hc⊥/Hc∥=5.81). Therefore, it is demonstrated that the thin film of Embodiment 7 has sufficient perpendicular magnetic anisotropy for the perpendicular magnetic recording.

(Other modified embodiments)

In the foregoing, the present invention is explained using a typical embodiment and specific embodiments. The present invention is not limited thereto and can be modified in various ways within the gist of the present invention.

(Advantage of the present invention)

Even in the case where a glass substrate (for a hard disk of industrial use) is used to form a data recording medium (using the ordered alloy thin film with $L1_0$ crystal structure) in accordance with the method of the present invention, the

TABLE 2

|  | P (Pa) | D (mm) | P × D (Pa · mm) | d: Film thickness (nm) | I: fct (001) Integrated intensity for fct (001) line (CPS) | I/d (CPS/nm) | Mr ⊥/Mr ∥ | Hc ⊥/Hc ∥ |
|---|---|---|---|---|---|---|---|---|
| Comparative Example 2 | 50 | 50 | 2500 | 52 | 1089 | 20.9 | 0.8 | 0.91 |
| Comparative Example 3 | 0.5 | 50 | 25 | 46 | 200 | 4.34 | 0.18 | 1.25 |
| Comparative Example 4 | 5 | 50 | 250 | 44 | 309 | 7.02 | 0.36 | 0.93 |
| Comparative Example 5 | 20 | 50 | 1000 | 48 | 328 | 6.83 | 0.16 | 0.46 |

A ratio of the residual magnetization in the perpendicular direction to that in the in-plane direction (Mr⊥/Mr∥), and a ratio of the coercivity in the perpendicular direction and that in the in-plane direction (Hc⊥/Hc∥) (serving as indexes of the perpendicular anisotropy) for each of the formed thin films are shown in Table 2 and plotted by solid circles in FIGS. 4 and 5.

According to FIG. 3 showing the results of the Comparative Examples 2–5, the ordered phase is formed but insufficient compared to those formed under the conditions satisfying P×D>3000.

Furthermore, from the distribution data plotted by solid circles shown in FIGS. 4 and 5, the perpendicular anisotropy is not excellent within the range of P×D<3000.

(Embodiment 7)

According to another embodiment employing the manufacturing method of the present invention, a thin film was manufactured as follows: FePt was deposited at a gas pressure (P) of 70 Pa while keeping a target-substrate distance (D) of 95 mm. In this condition, a P×D value resulted in 6650, sufficiently satisfying Equation 1. The thin film medium was manufactured in the same method as in Embodiment 1 except that the film thickness was set at 13 nm.

formation of the ordered phase (required for expressing large magnetocrystalline anisotropy) can be accelerated at a relatively low temperature range allowing usage of the glass substrate. As a result, the formed thin film exhibits excellent perpendicular magnetic anisotropy as compared to that formed by a conventional technique. Furthermore, a small magnetic domain structure is obtained. Hence, the method of the present invention is preferable in view of the magnetic recording.

The manufacturing method of the present invention makes it possible to form a thin film having an excellent perpendicular magnetic anisotropy regardless of a kind of substrate. The thin film formed according to the manufacturing method of the present invention has a sufficient magnetic property suitable for the perpendicular magnetic recording in practice and can be formed by using an inexpensive substrate. Therefore, the manufacturing cost can be reduced.

According to the method of manufacturing a thin film using an ordered alloy with $L1_0$ crystal structure of the present invention, it is possible to accelerate the formation of the ordered phase required for exhibiting a large magnetrocrystalline anisotropy at a relatively low temperature allowing usage of the glass or the Al substrate (for a hard disk for industrial use). Hence, it is possible to provide a method of manufacturing a recording medium excellent thermal stability in high-density recording data, in particular, magnetic recording data. As a result, the present invention can be applied to manufacturing process of the thin film suitable for perpendicular magnetic recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method of manufacturing a data recording medium for recording reproducing data by use of a magnetic field or light formed of an ordered alloy thin film comprising the steps of:

forming at least one underlayer on a substrate, the underlayer being principally made of an element or a compound selected from the group consisting of Cr, Pt, Pd, Au, Fe, Ni, MgO and NiO and controlled in such a way that a crystal plane having a crystal lattice face of a Miller index (100) is in parallel to the substrate; and forming an ordered alloy layer with $L1_0$ crystal structure on the underlayer by sputter deposition within the range satisfying Equation 1:

$$P \times D > 3000 \qquad \text{(Equation 1)}$$

where P is Ar sputter-gas pressure (Pa) and D is a distance (mm) between a sputtering target and the substrate.

2. The method according to claim 1, wherein said underlayer is formed of a Cr alloy.

3. The method according to claim 1, wherein said ordered alloy layer with $L1_0$ crystal structure is formed of FePt, CoPt, FePd or an alloy thereof.

* * * * *

UNITED STATES PATENT AND TRADEMARK OFFICE
CERTIFICATE OF CORRECTION

PATENT NO. : 6,068,739
DATED : May 30, 2000
INVENTOR(S) : T. Suzuki et al.

It is certified that error appears in the above-identified patent and that said Letters Patent is hereby corrected as shown below:

| COLUMN | LINE | | |
|---|---|---|---|
| Title page, item [75] Title Page, col. 1 | item Inventors line 5 | "all of Akita, Japan" should read --all of Akita-ken, Japan-- | |
| item [56] Title page, col. 1 | Refs. Cited (Other Publns., Item 1) | "et al," should read --et al.,-- | |
| item [56] col. 1 | Refs. Cited (Other Publns., Item 1) | "(nonth unknown" should read --(month unknown-- | |

UNITED STATES PATENT AND TRADEMARK OFFICE
CERTIFICATE OF CORRECTION

Page 2 of 2

PATENT NO. : 6,068,739
DATED : May 30, 2000
INVENTOR(S) : T. Suzuki et al.

It is certified that error appears in the above-identified patent and that said Letters Patent is hereby corrected as shown below:

COLUMN    LINE

11    19    "for recording reproducing data" should read --for recording and reproducing data--

(Claim 1, line 2)

Signed and Sealed this

Tenth Day of April, 2001

*Attest:*

NICHOLAS P. GODICI

*Attesting Officer*    *Acting Director of the United States Patent and Trademark Office*